(12) United States Patent
Wilson (10) Patent No.: US 8,648,809 B2
(45) Date of Patent: Feb. 11, 2014

(54) RECONFIGURATION OF VIRTUAL KEYBOARD

(75) Inventor: Robert A. Wilson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 359 days.

(21) Appl. No.: 12/817,024

(22) Filed: Jun. 16, 2010

(65) Prior Publication Data

US 2011/0310019 A1    Dec. 22, 2011

(51) Int. Cl.
*G06F 3/02*    (2006.01)
*G09G 5/00*    (2006.01)

(52) U.S. Cl.
USPC .......................................... 345/168; 345/173

(58) Field of Classification Search
USPC .................................................. 345/168, 173
See application file for complete search history.

(56) References Cited

U.S. PATENT DOCUMENTS

| 5,936,614 | A | 8/1999 | An et al. | |
|---|---|---|---|---|
| 6,359,572 | B1 | 3/2002 | Vale | |
| 7,614,008 | B2 | 11/2009 | Ording | |
| 2010/0090964 | A1* | 4/2010 | Soo et al. | 345/173 |
| 2010/0164897 | A1* | 7/2010 | Morin et al. | 345/173 |
| 2010/0259561 | A1* | 10/2010 | Forutanpour et al. | 345/660 |
| 2011/0264442 | A1* | 10/2011 | Huang et al. | 704/9 |
| 2012/0075194 | A1* | 3/2012 | Ferren | 345/168 |

FOREIGN PATENT DOCUMENTS

JP    2004-341813    12/2004

OTHER PUBLICATIONS

Tovi Grossman et al., "Modeling Pointing at Targets of Arbitrary Shapes," CHI Proceedings, Apr. 28-May 3, 2007, San Jose, CA, pp. 463-472.
"Adaptive keyboard system for text entry on touch screens," RD-429001-A (Jan. 10, 2000), 1 page.

* cited by examiner

*Primary Examiner* — Kwang-Su Yang
(74) *Attorney, Agent, or Firm* — Griffiths & Seaton PLLC (57) ABSTRACT

Various embodiments for configuring a virtual keyboard on a display surface are provided. In one such embodiment, at least one coordinate value mapped to a delimited area of the virtual keyboard, is determined. The at least one coordinate value corresponds to a touch input by the user on the display surface. The at least one coordinate value is compared to at least one historical coordinate value previously obtained for the delimited area. At least one of a location of and the delimited area of the virtual keyboard as projected on the display surface is adjusted to minimize a change between the at least one coordinate value and the at least one historical coordinate value.

24 Claims, 5 Drawing Sheets

RECONFIGURATION OF VIRTUAL KEYBOARD

BACKGROUND OF THE INVENTION

1. Field of the Invention

The present invention relates in general to computers, and more particularly to apparatus, method and computer program product embodiments for reconfiguring a virtual keyboard in a touch sensitive input device.

2. Description of the Related Art

Input devices such as keyboards are commonly used as an interface between a user and a computer system. In an ongoing development, particularly as computing devices are increasingly designed to be portable, virtual, touch sensitive input devices, or projected on a surface with optical finger determination, such as so-called "virtual keyboards," are implemented as interfaces. A virtual keyboard, for example, is an input device in which the keys as displayed to the user are projected onto a touch-sensitive panel or other surface. The touch sensitive panel uses capacitive and/or resistive sensor technology, for example, to determine when a user has made touch contact with a finger. The location of the contact is mapped to a position of a projected key and registered as a press of the key as if the user had pressed the key on a conventional keyboard.

SUMMARY OF THE DESCRIBED EMBODIMENTS

Mobile computing devices such as phones and personal desktop assistants (PDAs) generally have a limited sized screen, and correspondingly, a small area for projecting a virtual keyboard. In addition, because such devices generally use a flat glass or glass-like surface, there is little or no conventional tactile feedback to the user. In most cases, such virtual keyboards use keys of fixed size. Use of these keyboards leads to frequent backspacing and rekeying of data.

In view of the foregoing, a need exists for a mechanism by which the accuracy of input in computing devices with limited-sized screens is dynamically improved. Accordingly, various embodiments for configuring a virtual keyboard on a display surface are provided. In one such embodiment, by way of example only, at least one coordinate value mapped to a delimited area of the virtual keyboard, is determined. The at least one coordinate value corresponds to a touch input by the user on the display surface. The at least one coordinate value is compared to at least one historical coordinate value previously obtained for the delimited area. At least one of a location of and the delimited area of the virtual keyboard as projected on the display surface is adjusted to minimize a change between the at least one coordinate value and the at least one historical coordinate value.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments provide mechanisms for dynamic reconfiguration of touch sensitive input devices, such as a virtual keyboard. In an embodiment implementing a virtual keyboard, for example, as keys are touched, the point of contact within the defined key area is recorded. The point of contact may then be further averaged with historical points of contact previously recorded. In a further embodiment, related operations such as backspace strokes associated with the key or use of arrow keys following entry of a word (indicating a correction) are further recorded. As time progresses, the size and/or position of the virtual keys may be reconfigured to accommodate the user as will be further described. To this end, the keys may grow and shrink, or the keys may change position in relation to each other.

Continuing the virtual keyboard embodiment further, if a key is always struck at the same location area, this key may be shrunk. In another embodiment, if a key is found to be frequently not struck, and then backspaced (or the left arrow key is used in another embodiment), following, then the size and/or the position of the key may be reconfigured to a size and/or location accommodating the location on the virtual keyboard that the user touches when they intend to press that key.

A variety of possible implementations of such mechanisms may be contemplated. For example, in virtual keyboards intended for child use, keys may be sized smaller and/or positioned closer together to accommodate a smaller finger spread. In another example, for disabled users, the virtual keyboard is configured to adapt to the physical characteristics of the particular user. Such implementations help to offset the inherent characteristics of touch sensitive input devices, such as the lack of tactile feedback as previously described. In addition, such implementations also help to reduce cost by providing touch sensitive input devices that are infinitely customizable within a similar platform, based on the physical and operational characteristics of the user.

In one embodiment, as a user presses an area of the display surface or screen where the keyboard is projected, coordinates of the area are recorded. The coordinates may be passed until a graphics area is found that claims ownership of the touch event. Once this occurs, the coordinates may be compared to previous values. If a backspace or arrow key is pressed subsequent to a keystroke, for example, the virtual key may be subject to modification as a result, as the value of that particular keystroke and the backspace event/arrow event may be combined into statistical analyses (e.g., historical averages) for that virtual key. In an additional example, if an autocorrect function is triggered, this triggering may be incorporated into the statistical analyses mentioned above. In one embodiment, an objective may be to modify the size and/or position of the virtual key such that the center of the historical average of key presses is in the center of the defined area of the virtual key. In another embodiment, the size and/or position of the key is modified slowly, (e.g., 1 pixel per keystroke), to avoid violent re-painting of the screen and sudden major key shifts.

As one of ordinary skill in the art will appreciate, the statistical analyses described above may vary according to a particular implementation. For example, statistical calculations may include formulating an average, a moving average, a weighted average, a harmonic average, a geometric average, a median, or a mode, among other statistical calculations. Modification of the size and/or position of the delimited area (such as the key boundary) of the virtual key may include expansion and contraction of the virtual key, and also may include expansion of one virtual key as another adjacent virtual key is contracted, and vice-versa. A portion of the virtual key (such as a length) may be expanded or contracted, again as one of ordinary skill in the art will appreciate.

Figure 1:
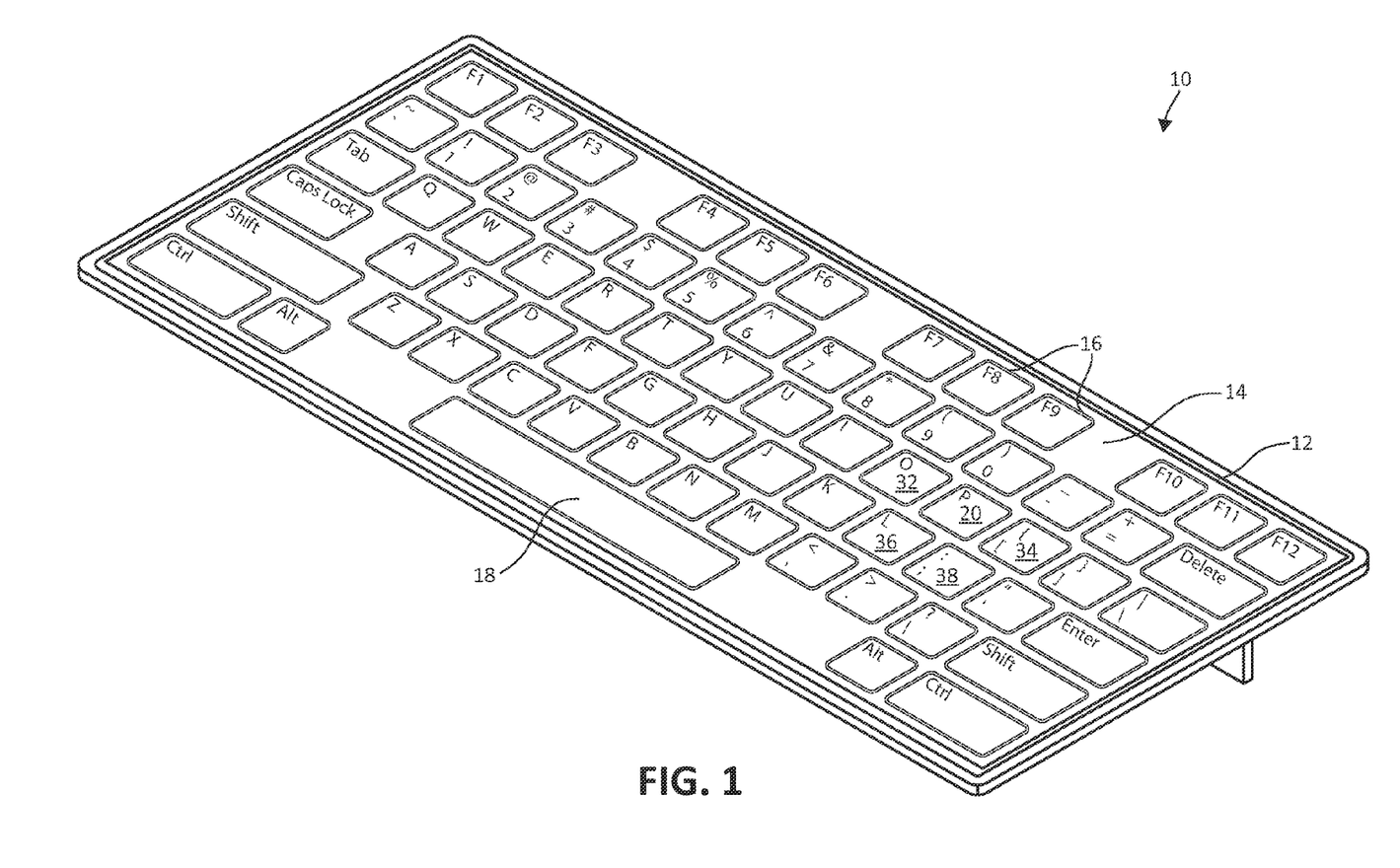
FIG. 1 illustrates a block diagram of an exemplary touch sensitive input device embodied as a virtual keyboard, capable of implementing various aspects of the present invention.

FIG. 1, following illustrates an exemplary touch sensitive input device 10 implemented as a virtual keyboard 12. Virtual keyboard 12 includes a touch sensitive display surface 14 configured to detect a touch signal indicating contact with a user (such as a finger, for example). A layout of various keys (e.g., keys 16, spacebar 18) is projected onto the display surface 14 as shown. For purposes of the following description, the O, P, open bracket ([), L, and semicolon (;) keys will receive further scrutiny. These keys are labeled with reference numbers 32, 20, 34, 36, and 38 respectively.

The virtual keyboard 12, including display surface 14, may be in electrical communication with one or more processor devices (see, e.g., processor 204, FIG. 7) for projecting the layout of virtual keys as previously described, detecting and registering the user input, and determining whether any subsequent changes need to be made to the layout as will be further described.

Figure 2:
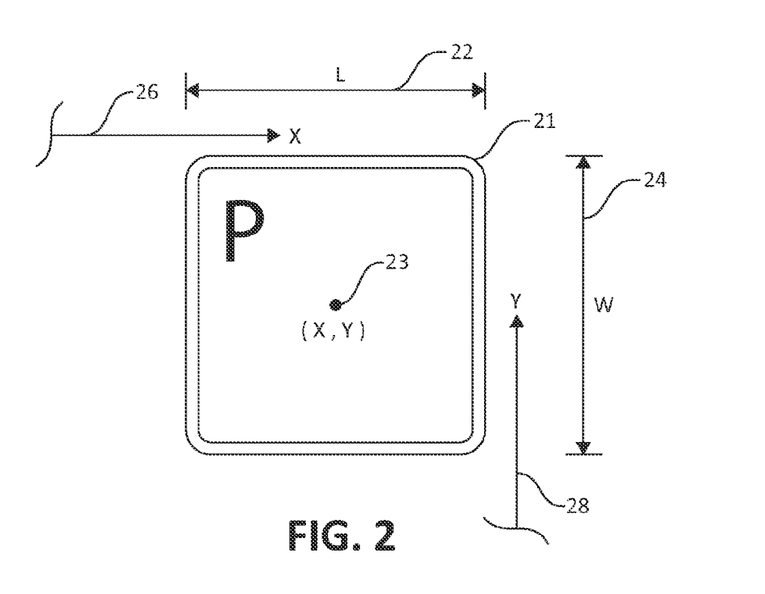
FIG. 2 illustrates exemplary positioning of a key of the virtual keyboard of FIG. 1.

Turning now to FIG. 2, the P key 20 is illustrated, along with various coordinate information, which, in one embodiment, may be used as will be further described. P key 20 is defined by a delimited area 21, and is further defined by a geographical center 23 of X and Y coordinates (X, Y) in terms of its position within the keyboard layout. Delimited area 21 includes a key length (L) 22, and a key width (W) 24 as shown. Delimited area 21 is positioned with the keyboard layout previously described in terms of a horizontal (X) 26 and vertical (Y) 28 coordinate.

Figure 3:
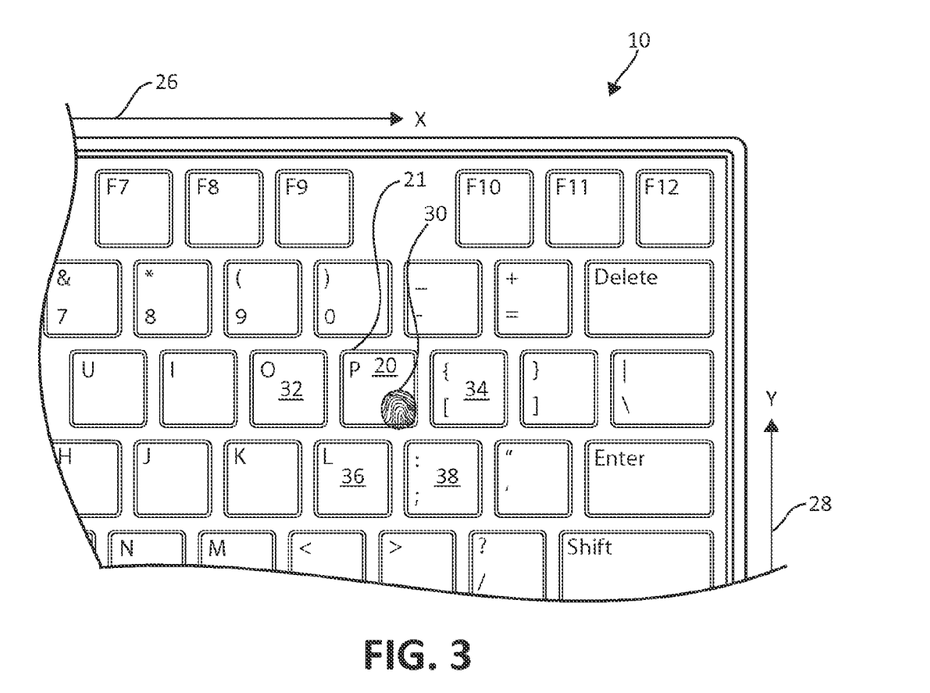
FIG. 3 illustrates an exemplary touch input performed on the virtual keyboard of FIG. 1.

FIG. 3, following, depicts a portion of the touch sensitive input device 10 of FIG. 1. As shown, the P key 20 is depicted in terms of its horizontal 26 and vertical position 28 in terms of the keyboard layout. Similarly, each additional key 32, 34, 36, and 38 are also configured having unique horizontal and vertical positions, as well as delimited areas (again as defined by length and width aspects).

A point of contact 30 (such as an area corresponding to a fingerprint) is shown on a portion of the delimited area 21 of P key 20. The point of contact 30 depicts a single keystroke at a particular period of time. As is shown, the point of contact 30 does not correspond to the geographical center of the delimited area 21, but rather the lower right corner of delimited are 21. As will be further illustrated, the point of contact 30 is registered. In one embodiment, a central location of the point of contact 30 is registered. As a result, a difference between a current central location of the delimited area 21 and the central location of the point of contact 30 may be determined. The difference value may be used subsequently as will be further described.

In one embodiment, as time progresses, a number of historical points of contact may be taken as a user makes contact with the P key 20. As previously described, concurrently other points of contact may be taken for keys 32, 34, 36, 38 and other keys in the virtual keyboard layout. In each case, the coordinate values of the point of contact of the user with the corresponding key (such as the length, width, X, and Y coordinate values) may be obtained corresponding to the particular virtual key. As previously mentioned, as each point of contact 30 is made with the P key 20, its geographical position with respect to the delimited area 21 and with respect to the keyboard layout (again, X and Y coordinate values, as well as length and width values, for example) are registered. As one of ordinary skill will appreciate, the historical values may be collected and stored by a processor and memory device.

Figure 4:
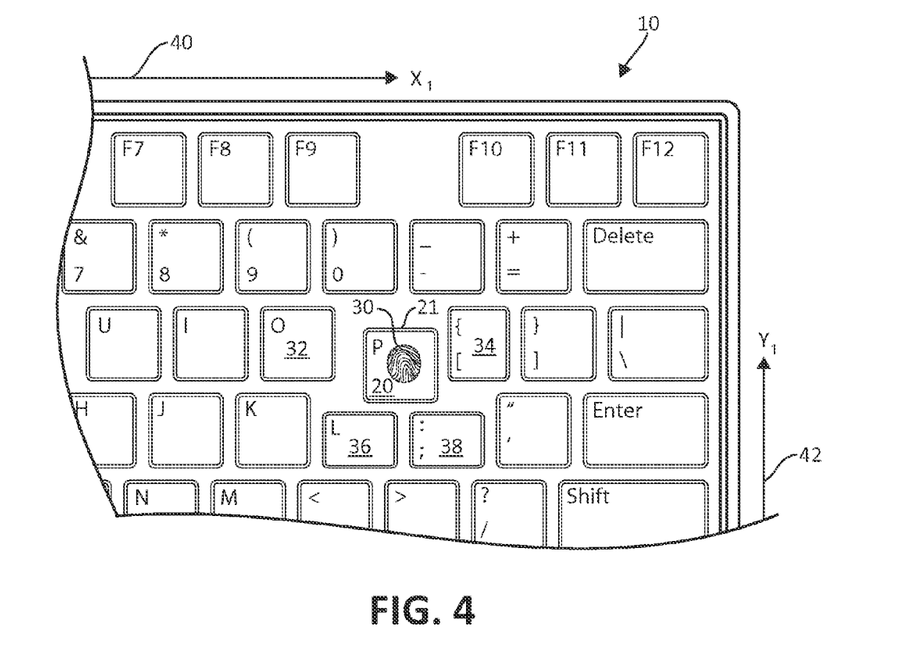
FIG. 4 illustrates a first exemplary mechanism for reconfiguring the virtual keyboard of FIG. 1 in response to the touch input.

Turning now to FIG. 4, the portion of the touch sensitive device is again depicted. However, as is shown, the position of the P key 20 has been changed relative to the former keyboard layout previously shown in FIG. 3. As was previously described, in one embodiment, the historical coordinate values may be collected and analyzed in statistical fashion (e.g., a historical average may be obtained). Other factors, such as whether the user pressed a backspace or arrow key following the keystroke in question, may be taken into account to determine the intent of the user. For example, if the backspace followed a particular keystroke of the P key 20, the mechanisms of the present invention may determine that the P key was pressed in error. As a result, the statistical analysis of the P key 20, as well as surrounding keys 32, 34, 36, and 38 may be also analyzed to determine if a surrounding key was intended to be pressed instead. As the skilled artisan will appreciate, other factors, such as a library of saved words, may also be taken into account FIG. 4 illustrates one embodiment of a reconfiguration change to the P key 20 following an analysis of the historical data, such as the previous point of contact depicted in FIG. 3, previously. In this case, the geographical position of the P key 20, in relation to the keyboard layout (such as the $X_1$ and $Y_1$ coordinates 40, and 42), are changed. In the depicted example, the historical averages of the coordinate values mapped to the P key 20 are analyzed. The geographical center (having $X_1$ and $Y_1$ coordinates 40 and 42) is changed such that the change between at least one of the historical values and a recent point of contact 30 is minimized. In other words, if a user presses the P key 20 (such as the point of contact 30 depicted in FIG. 3, previously), and a subsequent time presses the P key 20, the mechanisms of the present invention adjust the geographical location of the P key 20 such that any change between the subsequent keystroke and one or more historical values (such as the historical average) is minimized. This mechanism results in a repositioning of the P key 20 such that the center of the key is maintained at the center of the historical average of the historical values, for example.

As is shown, while the position of the P key 20 is changed to reflect the repositioning as previously described, the size and/or position of the surrounding keys of the keyboard layout, such as the depicted L key 36 and semicolon key 38, may be changed to accommodate the repositioning.

Figure 5:
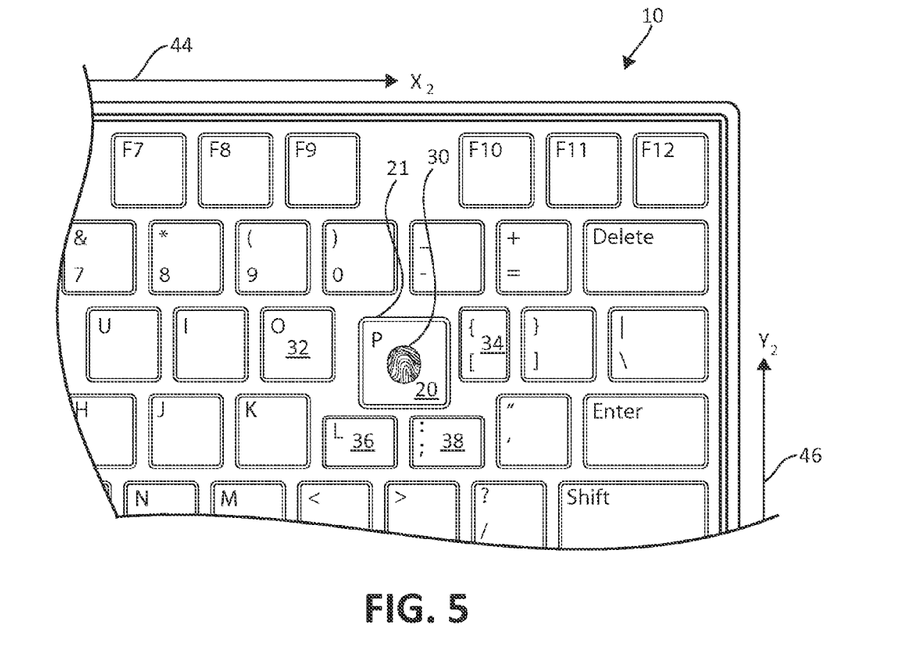
FIG. 5 illustrates a second exemplary mechanism for reconfiguring the virtual keyboard of FIG. 1 in response to the touch input.

FIG. 5, alternatively, illustrates an additional embodiment showing an additional reconfiguration change to the P key 20, where the delimited area 21 of the P key 20 is changed pursuant to statistical analysis described previously. In the depicted embodiment, instead of the geographical location being changed to reflect such analysis, the size of the delimited area 21 is changed. Here as before, neighboring keys such as keys 36 and 38 may also be resized to reflect such repositioning. Also here as before, the ultimate result of such reconfiguration changes is that the center of the key is maintained at the center of the historical average of the historical values.

An additional embodiment is contemplated where, again pursuant to the statistical analysis, aspects of the size of the delimited area 21 and positioning aspects of the P key 20 are modified. Referring again to FIG. 5, it is possible that both the size of the delimited area 21 and horizontal and vertical positioning ($X_2$ and $Y_2$ coordinates 44 and 46) are adjusted as shown.

Figure 6:
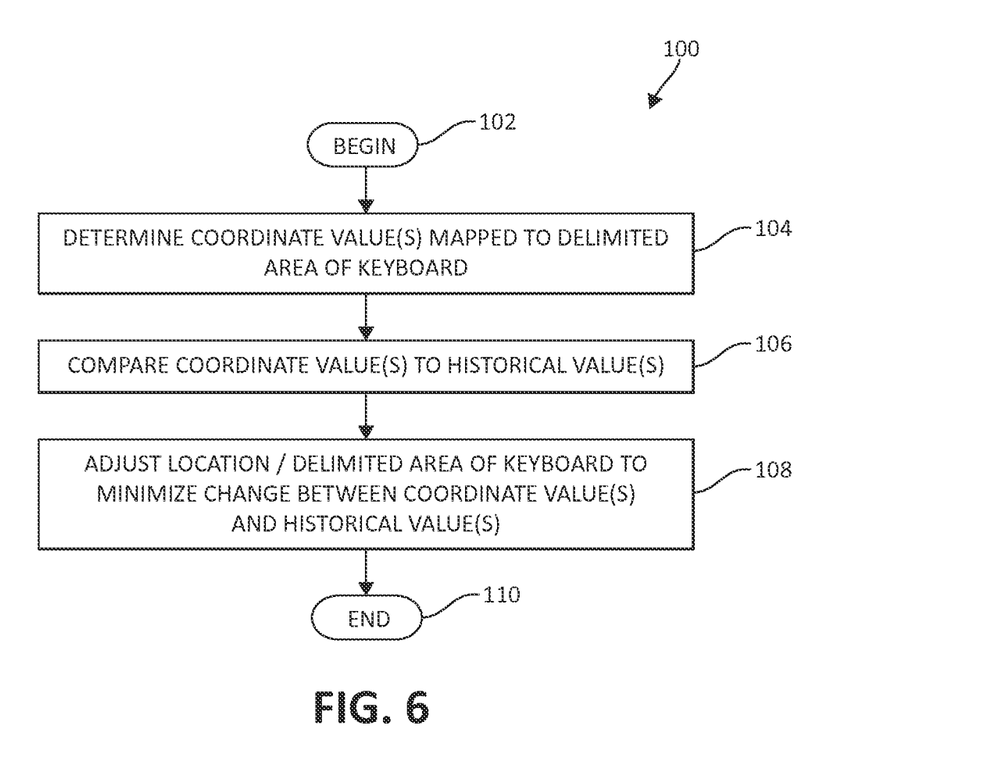
FIG. 6 illustrates a method for reconfiguration of a virtual keyboard in accordance with one embodiment of the present invention.

Turning to FIG. 6, following, an exemplary method 100 for dynamically reconfiguring a touch screen input device in a computing environment according to aspects of the present invention is illustrated in flow chart diagram format. As one of ordinary skill in the art will appreciate, various steps in the method 100 may be implemented in differing ways to suit a particular application. In addition, the described method 300 may be implemented by various means, such as hardware, software, firmware, or a combination thereof operational on or otherwise associated with the computing environment. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) with, following detection of a user's touch, a determination of the applicable coordinate values mapped to the applicable delimited values, such as the delimited values of a key as previously described (step 104). The coordinate values are then stored. The stored coordinate value(s) are compared against historical value(s) (step 106) in one or more statistical analyses. A location and/or the applicable delimited area is then adjusted to minimize the change between the coordinate value(s) and the historical value(s) (step 108). The method then ends (step 110).

Figure 7:
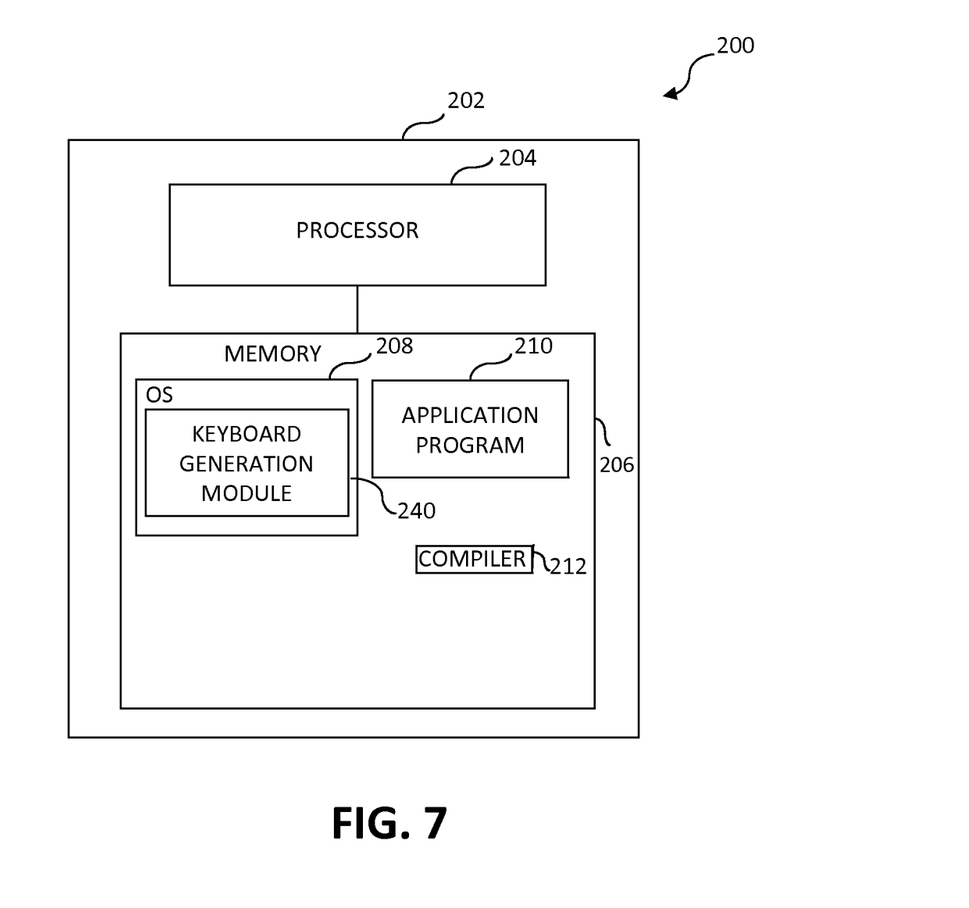
FIG. 7 illustrates an exemplary computing environment, including a processor device, in which the virtual keyboard of FIG. 1 is operable.

Turning now to FIG. 7, an exemplary processing component 200 of the touch sensitive input device 10 shown in FIG. 1, previously, is illustrated. Processing component is operable in a computer environment, in which mechanisms of the previously illustrated embodiments may be implemented. It should be appreciated, however, that FIG. 7 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

In the illustrated embodiment, processing component 200 includes a processor 204, and a memory 206, such as random access memory (RAM). The processor 204 may be adapted to detect the touch input from a user as previously described, store such input in memory 206, and determine applicable coordinate values corresponding to a delimited area as previously described. Additional aspects of the mechanisms of the present invention may be implemented by processing component 200 as one of ordinary skill in the art will appreciate. The processing component 200 may be integrated into the touch screen input device, or may be connected via a communications link, network, or additional mechanism.

In the illustrated embodiment, the processing component 200 operates under control of an operating system (OS) 208 (e.g. z/OS, OS/2, LINUX, UNIX, WINDOWS, MAC OS) stored in the memory 206, and interfaces with the user to accept inputs and commands and to present results. In one embodiment of the present invention, the OS 208 facilitates keyboard configuration functionality according to the present invention. To this end, OS 208 includes a keyboard generation module 240, which may be adapted for carrying out various processes and mechanisms previously described.

The processing component 200 may implement a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the application program 210 accesses and manipulates data stored in the memory 206 of the processing component 200 using the relationships and logic that was generated using the compiler 212.

In one embodiment, instructions implementing the operating system 208, the application program 210, and the compiler 212, as well as the keyboard generation module 240 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 208 and the application program 210 comprise instructions which, when read and executed by the computing storage environment to perform the steps necessary to implement and/or use the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for configuring a virtual keyboard projected on a display surface, comprising:
   displaying an original virtual keyboard layout on the display surface;
   receiving a touch input on the display surface within the original virtual keyboard layout, the touch input representing a keystroke;
   determining at least one coordinate value mapped to a delimited area of an original virtual keyboard, the at least one coordinate value corresponding to the touch input by a user on the display surface, and the delimited area of the original virtual keyboard representing a virtual key;
   comparing the at least one coordinate value to at least one historical coordinate value previously obtained for the delimited area;
   adjusting at least one of a location of and the delimited area of the virtual keyboard as projected on the display surface to minimize a change between the at least one coordinate value and the at least one historical coordinate value by modifying the location of or the delimited area of the virtual keyboard one pixel in response to receipt of the keystroke to thereby display an adjusted virtual keyboard layout;
   receiving an additional touch input on the display surface within the adjusted virtual keyboard layout, the touch input representing an additional keystroke;
   repeating the steps of determining, comparing and adjusting for the additional touch input; and
   modifying the location of or the delimited area of the virtual keyboard another pixel in response to receipt of the additional keystroke to thereby display an updated adjusted virtual keyboard layout.

2. The method of claim 1, wherein:
   the step of comparing the at least one coordinate value to the at least one historical coordinate value includes considering the at least one coordinate value as an additional value in a statistical calculation of the at least one coordinate value and the at least one historical coordinate value, and
   the step of adjusting the delimited area of the virtual keyboard includes adjusting the delimited area such that a coordinate result of the statistical calculation of the at least one coordinate value and the at least one historical coordinate value is centered in the delimited area of the virtual keyboard.

3. The method of claim 2, wherein the step of considering the at least one coordinate value as the additional value in the statistical calculation includes considering one of using a backspace function and an arrow function subsequent to the touch input by the user in the statistical calculation.

4. The method of claim 2, wherein the step of considering the at least one coordinate value as the additional value in the statistical calculation includes considering use of an autocorrect function subsequent to the touch input by the user in the statistical calculation.

5. The method of claim 2, wherein the step of considering the at least one coordinate value as an additional value in a statistical calculation includes formulating one of an average, a moving average, a weighted average, a harmonic average, a geometric average, a median, and a mode of the at least one coordinate value and the at least one historical coordinate value.

6. The method of claim 1, wherein the step of adjusting the delimited area of the virtual keyboard includes resizing the delimited area of the virtual keyboard vis-à-vis another delimited area of the virtual keyboard.

7. The method of claim 6, wherein the step of resizing the delimited area includes performing one of expanding and contracting the delimited area of the virtual keyboard, and one of expanding and contracting the another delimited area of the virtual keyboard.

8. The method of claim 1, wherein the delimited area of the virtual keyboard is a key boundary, and the step of adjusting the delimited area of the virtual keyboard includes adjusting at least one dimension of the key boundary.

9. A system for configuring a virtual keyboard projected on a display surface, comprising:
a processor device, wherein the processor device is configured for:
displaying an original virtual keyboard layout on the display surface;
receiving a touch input on the display surface within the original virtual keyboard layout, the touch input representing a keystroke;
determining at least one coordinate value mapped to a delimited area of an original virtual keyboard, the at least one coordinate value corresponding to the touch input by a user on the display surface, and the delimited area of the original virtual keyboard representing a virtual key;
comparing the at least one coordinate value to at least one historical coordinate value previously obtained for the delimited area;
adjusting at least one of a location of and the delimited area of the virtual keyboard to minimize a change between the at least one coordinate value and the at least one historical coordinate value by modifying the location of or the delimited area of the virtual keyboard one pixel in response to receipt of the keystroke to thereby display an adjusted virtual keyboard layout;
receiving an additional touch input on the display surface within the adjusted virtual keyboard layout, the touch input representing an additional keystroke;
repeating the steps of determining, comparing and adjusting for the additional touch input; and
modifying the location of or the delimited area of the virtual keyboard another pixel in response to receipt of the additional keystroke to thereby display an updated adjusted virtual keyboard layout.

10. The system of claim 9, wherein the processor is further configured for:
pursuant to the step of comparing the at least one coordinate value to the at least one historical coordinate value, considering the at least one coordinate value as an additional value in a statistical calculation of the at least one coordinate value and the at least one historical coordinate value, and,
pursuant to the step of adjusting at least one of the location of and the delimited area of the virtual keyboard, adjusting the delimited area such that a coordinate result of the statistical calculation of the at least one coordinate value and the at least one historical coordinate value is centered in the delimited area of the virtual keyboard.

11. The system of claim 10, wherein the processor is configured for, pursuant to the step of considering the at least one coordinate value as the additional value in the statistical calculation, considering one of using a backspace function and an arrow function subsequent to the touch input by the user in the statistical calculation.

12. The system of claim 10, wherein the processor is configured for, pursuant to the step of considering the at least one coordinate value as the additional value in the statistical calculation, considering use of an autocorrect function subsequent to the touch input by the user in the statistical calculation.

13. The system of claim 10, wherein the processor is configured for, pursuant to the step of considering the at least one coordinate value as an additional value in a statistical calculation, formulating one of an average, a moving average, a weighted average, a harmonic average, a geometric average, a median, and a mode of the at least one coordinate value and the at least one historical coordinate value.

14. The system of claim 9, wherein the processor device is further configured for, pursuant to the step of adjusting the delimited area of the virtual keyboard, resizing the delimited area of the virtual keyboard vis-à-vis another delimited area of the virtual keyboard.

15. The system of claim 14, wherein the processor is further configured adapted for, pursuant to the step of resizing the delimited area, performing one of expanding and contracting the delimited area of the virtual keyboard, and one of expanding and contracting the another delimited area of the virtual keyboard.

16. The system of claim 9, wherein the delimited area of the virtual keyboard is a key boundary, and the processor is further configured for, pursuant to the step of adjusting the delimited area of the virtual keyboard, adjusting at least one dimension of the key boundary.

17. A computer program product for configuring a virtual keyboard projected on a display surface, the computer program product comprising a non-transitory computer-readable storage medium having computer-readable program code portions stored therein, the computer-readable program code portions comprising:
a first executable portion for displaying an original virtual keyboard layout on the display surface;
a second executable portion for receiving a touch input on the display surface within the original virtual keyboard layout, the touch input representing a keystroke;
a third executable portion for determining at least one coordinate value mapped to a delimited area of an original virtual keyboard, the at least one coordinate value corresponding to the touch input by a user on the display surface, and the delimited area of the original virtual keyboard representing a virtual key;
a fourth executable portion for comparing the at least one coordinate value to at least one historical coordinate value previously obtained for the delimited area;
a fifth executable portion for adjusting at least one of a location of and the delimited area of the virtual keyboard to minimize a change between the at least one coordinate value and the at least one historical coordinate value by modifying the location of or the delimited area of the virtual keyboard one pixel in response to receipt of the keystroke to thereby display an adjusted virtual keyboard layout;
a sixth executable portion for receiving an additional touch input on the display surface within the adjusted virtual keyboard layout, the touch input representing an additional keystroke;

a seventh executable portion for repeating the steps of determining, comparing and adjusting for the additional touch input; and an eighth executable portion for modifying the location of or the delimited area of the virtual keyboard another pixel in response to receipt of the additional keystroke to thereby display an updated adjusted virtual keyboard layout.

18. The computer program product of claim 17, further including a ninth executable portion for:

pursuant to the step of comparing the at least one coordinate value to the at least one historical coordinate value, considering the at least one coordinate value as an additional value in a statistical calculation of the at least one coordinate value and the at least one historical coordinate value, and pursuant to the step of adjusting the delimited area of the virtual keyboard, adjusting the delimited area such that a coordinate result of the statistical calculation of the at least one coordinate value and the at least one historical coordinate value is centered in the delimited area of the virtual keyboard.

19. The computer program product of claim 18, further including a tenth executable portion for, pursuant to the step of considering the at least one coordinate value as the additional value in the statistical calculation, considering one of using a backspace function and an arrow function subsequent to the touch input by the user in the statistical calculation.

20. The computer program product of claim 18, further including a tenth executable portion for, pursuant to the step of considering the at least one coordinate value as the additional value in the statistical calculation, considering use of an autocorrect function subsequent to the touch input by the user in the statistical calculation.

21. The computer program product of claim 18, further including a tenth executable portion for, pursuant to the step of considering the at least one coordinate value as an additional value in a statistical calculation, formulating one of an average, a moving average, a weighted average, a harmonic average, a geometric average, a median, and a mode of the at least one coordinate value and the at least one historical coordinate value.

22. The computer program product of claim 17, further including a ninth executable portion for, pursuant to the step of adjusting the delimited area of the virtual keyboard, resizing the delimited area of the virtual keyboard vis-à-vis another delimited area of the virtual keyboard.

23. The computer program product of claim 22, further including a tenth executable portion for, pursuant to the step of resizing the delimited area, performing one of expanding and contracting the delimited area of the virtual keyboard, and one of expanding and contracting the another delimited area of the virtual keyboard.

24. The method of claim 17, wherein the delimited area of the virtual keyboard is a key boundary, and further including a fifth executable portion for, pursuant to the step of adjusting the delimited area of the virtual keyboard, adjusting at least one dimension of the key boundary.

* * * * *